US012756418B2

(12) United States Patent
Yang

(10) Patent No.: US 12,756,418 B2
(45) Date of Patent: Oct. 6, 2026

(54) RIGID PROTECTIVE CASE CONVENIENT FOR MOUNTING AND REMOVAL

(71) Applicant: Shenzhen RUILAITE Technology Co., Ltd., Shenzhen (CN)

(72) Inventor: Yongquan Yang, Shenzhen (CN)

(73) Assignee: Shenzhen RUILAITE Technology Co., Ltd., Shenzhen (CN)

( * ) Notice: Subject to any disclaimer, the term of this patent is extended or adjusted under 35 U.S.C. 154(b) by 243 days.

(21) Appl. No.: 18/826,705

(22) Filed: Sep. 6, 2024

(65) Prior Publication Data

US 2024/0429960 A1 Dec. 26, 2024

(51) Int. Cl.

| | |
|---|---|
| ***H04B 1/38*** | (2015.01) |
| ***H04B 1/3888*** | (2015.01) |
| ***H04M 1/00*** | (2006.01) |
| ***H04M 1/02*** | (2006.01) |

(52) U.S. Cl.

CPC .................................. *H04B 1/3888* (2013.01)

(58) Field of Classification Search

None

See application file for complete search history.

(56) References Cited

U.S. PATENT DOCUMENTS

| | | | | |
|---|---|---|---|---|
| 9,123,935 B2 * | 9/2015 | Huang | A45C 11/00 | |
| 9,997,933 B2 * | 6/2018 | Huang | H02J 7/751 | |
| 10,058,155 B2 * | 8/2018 | Guerdrum | G06F 1/1628 | |
| 11,121,735 B2 * | 9/2021 | Kim | H04B 1/3888 | |
| 2009/0111543 A1 * | 4/2009 | Tai | H04M 1/0283 | 455/575.8 |
| 2010/0243516 A1 * | 9/2010 | Martin | G11B 31/00 | 206/701 |
| 2010/0302716 A1 * | 12/2010 | Gandhi | G06F 1/1624 | 455/575.8 |
| 2013/0126531 A1 * | 5/2013 | Hynecek | A45C 11/00 | 220/315 |
| 2013/0299498 A1 | 11/2013 | Magness et al. | | |
| 2014/0284243 A1 | 9/2014 | Tucker | | |
| 2015/0053583 A1 | 2/2015 | McCormick et al. | | |
| 2015/0133204 A1 * | 5/2015 | Ivanovski | H04B 1/3888 | 455/575.8 |

* cited by examiner

*Primary Examiner* — Pablo N Tran

(74) *Attorney, Agent, or Firm* — Hemisphere Law, PLLC

(57) ABSTRACT

The rigid protective case convenient for mounting and removal is provided, including a case body, a locking portion, and a resetting portion; the case body includes a main case and an auxiliary case; the auxiliary case may move away from or approach the main case, and an accommodating space configured to place an electronic device is enclosed and formed between the main case and the auxiliary case; the locking portion is mounted on the main case and can lock or unlock the auxiliary case that approaches the main case; the resetting portion includes a first magnetic body mounted on the main case and a second magnetic body mounted on the auxiliary case; and the first magnetic body and the second magnetic body are mutually exclusive to drive the auxiliary case to move away from the main case.

10 Claims, 14 Drawing Sheets

RIGID PROTECTIVE CASE CONVENIENT FOR MOUNTING AND REMOVAL

TECHNICAL FIELD

The present disclosure belongs to the technical field of protective cases, and in particular, to a rigid protective case convenient for mounting and removal.

BACKGROUND

Electronic devices such as a mobile phone and a tablet are breakable and fragile, so protective cases are usually added for protection. At present, protective cases on the market mainly includes flexible protective cases and rigid protective cases. The electronic device is inserted into the flexible protective case relying on the deformation of the flexible protective case and is then fixed after the flexible protective case is recovered. The flexible protective case is convenient to use, but has poor protective capability. However, most rigid protective cases are made of metal materials, which have relatively high protective capability. However, they cannot mount and fix the electronic devices through their own deformation. Therefore, the rigid protective cases are designed to be multi-stage.

For example, in Chinese patent No. 201620733532.0, a split type mobile phone case is mentioned. The split type mobile phone case includes a main body, an upper structure, and a lower structure. Both the upper structure and the lower structure are buckled to the main body to achieve clamping, fixation, and removal of a mobile phone. However, to remove the mobile phone from this rigid mobile phone case, a user often needs to hold the main body with one hand and remove the upper and lower structures with the other hand. The entire process is cumbersome in operation, has poor user experience, and easily causes the mobile phone to be separated from the main body and fall off, bringing losses to the user.

SUMMARY

(I) Technical Problems to be Solved

The present disclosure provides a rigid protective case convenient for mounting and removal, and aims to solve the problem that it is hard to mount and remove the rigid protective case on and from an electronic device.

(II) Technical Solutions

To achieve the above objective, the present disclosure provides the following technical solutions:

A rigid protective case convenient for mounting and removal includes a case body, a locking portion, and a resetting portion; the case body includes a main case and an auxiliary case; the auxiliary case is slidably connected to the main case; the auxiliary case can move away from or approach the main case; an accommodating space configured to place an electronic device is enclosed and formed between the main case and the auxiliary case; the locking portion is mounted on the main case; when the auxiliary case approaches the main case, the locking portion can lock or unlock the auxiliary case; the resetting portion includes a first magnetic body and a second magnetic body; the first magnetic body is mounted on the main case; the second magnetic body is mounted on the auxiliary case; and the first magnetic body and the second magnetic body are mutually exclusive to drive the auxiliary case to move away from the main case.

Preferably, a guide cavity is provided on the main case; a guide block is arranged on the auxiliary case; the guide block is mounted in the guide cavity and is in sliding fit with the guide cavity, so that the auxiliary case moves away from or approaches the main case; and when the auxiliary case approaches the main case, the locking portion can lock or unlock the guide block in the guide cavity.

Preferably, a movable port that communicates the outside world with the guide cavity is arranged on a back side of the main case; the guide block is provided with a buckle; the locking portion includes a clamping head and a deflector rod; the clamping head is slidably arranged in the guide cavity; one end of the deflector rod is connected to the clamping head, and the other end of the deflector rod extends to the movable port; and the deflector rod is pushed to drive the clamping head to slide, so that the clamping head resists against or is separated from the buckle.

Preferably, a sliding chute is provided on an inner wall of the guide cavity; the sliding chute corresponds to the movable port; the clamping head is in sliding fit with the sliding chute; and the deflector rod is pushed to drive the clamping head to slide along the sliding chute, so that the clamping head resists against or is separated from the buckle.

Preferably, the locking portion further includes a first elastic member arranged in the guide cavity; two ends of the first elastic member respectively resist against the clamping head and an inner wall of the guide cavity; in a process of moving the clamping head to press the buckle, the first elastic member is compressed to stores energy; and after the clamping head resists against the buckle, the first elastic member releases energy for recovery.

Preferably, the first magnetic body is mounted on an inner wall of the guide cavity; the second magnetic body is mounted on a side wall of the guide block; and the first magnetic body and the second magnetic body are not intersected on the same plane.

Preferably, the rigid protective case further includes a cover plate, wherein a notch communicated to the guide cavity is provided on the main case; the cover plate is detachably mounted on the main case and covers the notch; a limiting block is arranged on a side wall of the guide cavity; a protruding block is arranged on the guide block; the guide block can be mounted in the guide cavity through the notch; and the protruding block resists against the limiting block as the auxiliary case moves away from the main case to restrict the guide block from being separated from the guide cavity.

Preferably, the main case is provided with two first resisting pins; the auxiliary case is provided with two second resisting pins; the two first resisting pins and the two second resisting pins are enclosed to form the accommodating space, and are respectively arranged in a manner of corresponding to four corners of the electronic device.

Preferably, a back side of the electronic device is synchronously adhered to the main case and the auxiliary case; top ends of the first resisting pins and top ends of the second resisting pins are hooked to synchronously resist against a front side rim of the electronic device, thereby preventing the electronic device from being separated from the accommodating space.

Preferably, the first resisting pins and the second resisting pins are provided with pin pads to be in contact with four corners of the electronic device.

Preferably, a rubber pad is laid on the main case and/or the auxiliary case, and the main case and/or the auxiliary case are in contact with and adhered to a back side of the electronic device through the rubber pad.

Preferably, the main case and/or the auxiliary case are provided with through holes that penetrate through the main case and/or the auxiliary case.

Preferably, the resetting portion includes a second elastic member configured to replace the first magnetic body and the second magnetic body; the second elastic member is mounted in the guide cavity; two ends of the second elastic member respectively resist against the inner wall of the guide cavity and the guide block; and when the auxiliary case approaches the main case, the second elastic member is compressed to store energy.

Preferably, a trench is provided on an inner wall of the guide cavity, and the trench is arranged in a moving direction of the guide block. The guide block is provided with a resisting block that is in sliding fit with the trench; the second elastic member is located in the trench; and two ends of the second elastic member respectively resist against an inner wall of the trench and the resisting block.

Preferably, the first elastic member and the second elastic member are springs.

(III) Beneficial Effects

The present disclosure provides a rigid protective case convenient for mounting and removal. The main case and auxiliary case that can slide each other are configured to clamp the electronic device. The locking portion is designed to fix the auxiliary case to the main case, thereby fixing the electronic device. The resetting portion is designed to drive the auxiliary case, so that the unlocked auxiliary case can automatically move away from the main case. Therefore, in a process of mounting and removing the electronic device, with one hand, a user can hold the main case, drive the auxiliary case to approach the main case, and operate the locking portion to lock or unlock the auxiliary case, and with the other hand, the user holds and places or takes out the electronic device. The entire mounting and removal process is not only easy to operate, but also can achieve the objective of opening/closing the case body with a single hand, making it convenient for the user to easily mount and remove the electronic device. Moreover, because the user holds the electronic device all the way, the electronic device can be avoided from falling off and being damaged in the mounting and removal process.

BRIEF DESCRIPTION OF THE DRAWINGS

The accompanying drawings are intended to provide a further understanding of the present disclosure and constitute a part of this specification. The accompanying drawings and embodiments of the present disclosure are used together to explain the present disclosure rather than constituting a limitation on the present disclosure. In the drawings.

Figure 1:
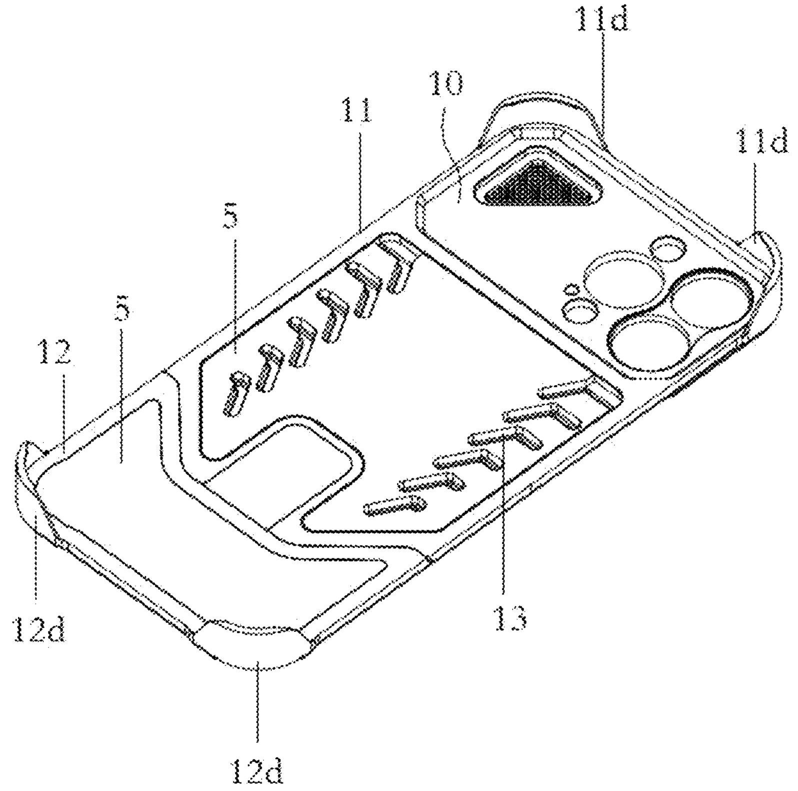
FIG. 1 shows a schematic diagram I of an entire structure according to a first embodiment of the present disclosure.
Figure 2:
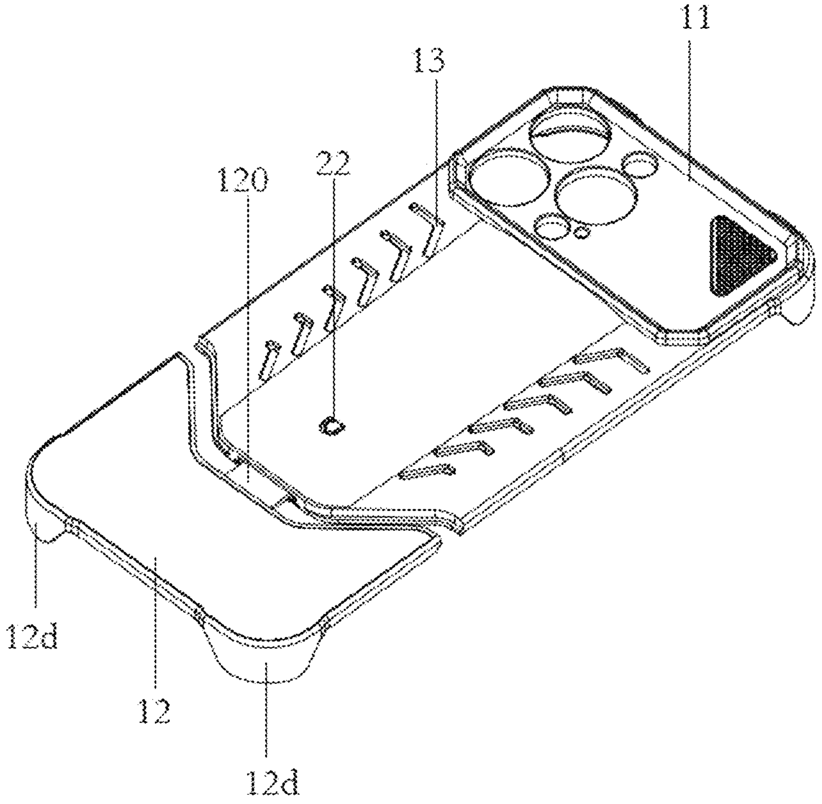
FIG. 2 shows a schematic diagram II of an entire structure according to a first embodiment of the present disclosure.
Figure 3:
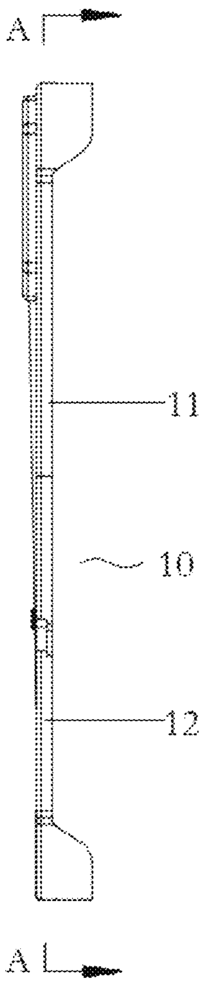
FIG. 3 shows a left view of FIG. 2.
Figure 4:
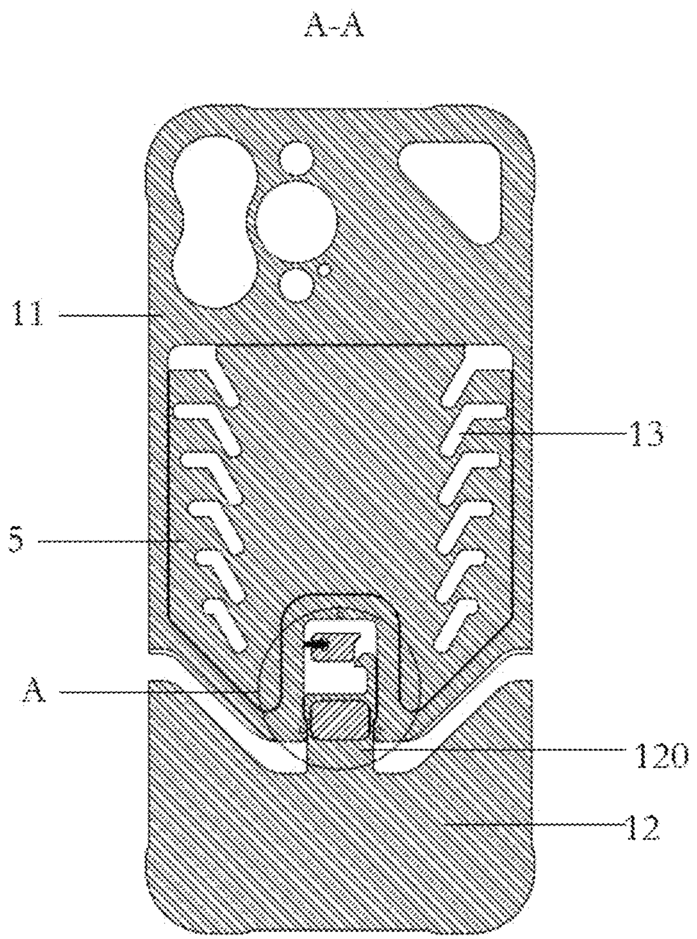
FIG. 4 shows a sectional view A-A of FIG. 3.
Figure 5:
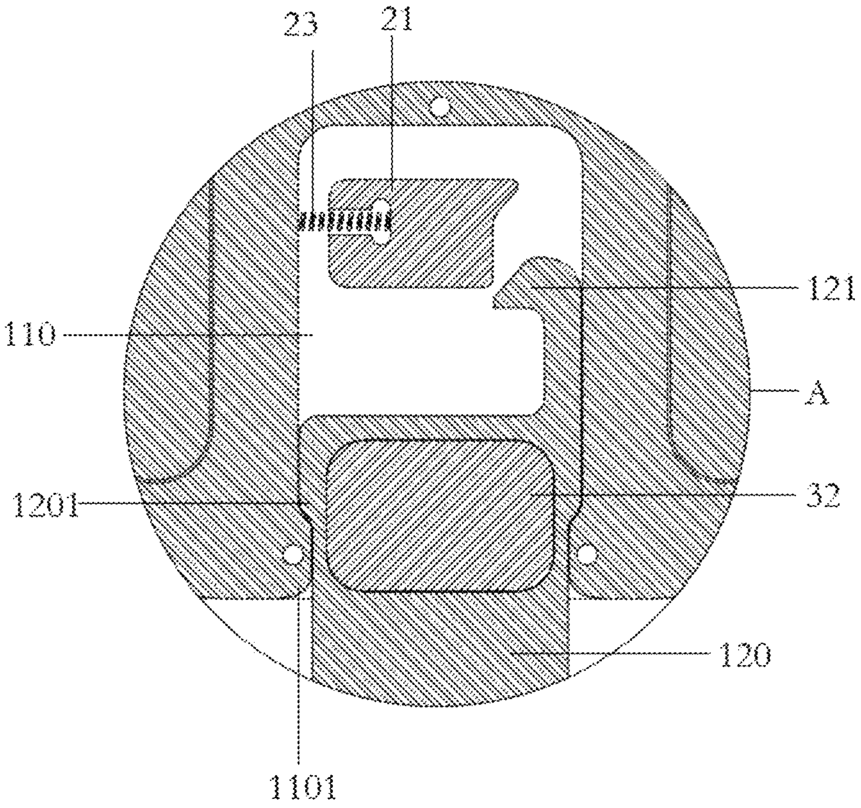
FIG. 5 shows an enlarged view of the part A in FIG. 4.

In the drawings: 1: case body; 10: accommodating space; 11: main case; 110: guide cavity; 1100: limiting block; 1101: sliding chute; 1102: trench; 111: movable port; 112: notch; **11*d*: first resisting pin; 12: auxiliary case; 120: guide block; 1201: protruding block; 1202: resisting block; 121: buckle; 12*d*: second resisting pin; 13: through hole; 2: locking portion; 21: clamping head; 22: deflector rod; 23: first elastic member; 3: resetting portion; 31: first magnetic body; 32: second magnetic body; 33; second elastic member; 4: cover plate; and 5**: rubber pad.

DETAILED DESCRIPTION OF THE EMBODIMENTS

The technical solutions in embodiments of the present disclosure are clearly and completely described in the following with reference to the accompanying drawings in the embodiments of the present disclosure. Apparently, the described embodiments are merely some rather than all the embodiments of the present disclosure. All other embodiments obtained by a person of ordinary skill in the art based on the embodiments of the present disclosure without making creative efforts shall fall within the protection scope of the present disclosure. It can be understood that the drawings are only for reference and illustration purposes and are not intended to limit the present disclosure. The connection relationship shown in the accompanying drawings is only for the sake of clear description and does not limit a connection method.

Referring to FIG. 1 to FIG. 6, a rigid protective case convenient for mounting and removal includes a case body 1, a locking portion 2, and a resetting portion 3. The case body 1 includes a main case 11 and an auxiliary case 12; the auxiliary case 12 is slidably connected to the main case 11; the auxiliary case 12 can move away from or approach the main case 11; an accommodating space 10 configured to place an electronic device (not shown) is enclosed and formed between the main case 11 and the auxiliary case 12; the locking portion 2 is mounted on the main case 11; when the auxiliary case 12 approaches the main case 11, the locking portion 2 can lock or unlock the auxiliary case 12; the resetting portion 3 includes a first magnetic body 31 and a second magnetic body 32; the first magnetic body 31 is mounted on the main case 11; the second magnetic body 32 is mounted on the auxiliary case 12; and the first magnetic body 31 and the second magnetic body 32 are mutually exclusive to drive the auxiliary case 12 to move away from the main case 11.

Specifically, to mount the electronic device, the locking portion 2 unlocks the auxiliary case 12. Under the repulsive action of the first magnetic body 31 and the second magnetic body 32, the auxiliary case 12 automatically moves away from the main case 11, thereby enlarging the accommodating space 10. At this time, the electronic device can be placed in the accommodating space 10. After a back side of the electronic device is attached to the main case 11 and the auxiliary case 12, the auxiliary case 12 moves to overcome the repulsive force between the first magnetic body 31 and the second magnetic body 32, and the auxiliary case 12 approaches the main case 11 to narrow the accommodating space 10. After the accommodating space 10 is adapted to the electronic device, the auxiliary case 12 is locked to the main case 11 by the locking portion 2, and the electronic device can be then fixed.

Similarly, to remove the electronic device, the locking portion 2 unlocks the auxiliary case 12. Under the repulsive action of the first magnetic body 31 and the second magnetic body 32, the auxiliary case 12 automatically moves away from the main case 11. After the accommodating space 10 becomes larger to a suitable range, and the electronic device can be then removed from the accommodating space 10.

In a process of mounting and removing the electronic device, with one hand, a user can hold the main case 11, drive the auxiliary case 12 to approach the main case 11, and operate the locking portion 2 to lock or unlock the auxiliary case 12, and with the other hand, the user holds and places or takes out the electronic device. The entire mounting and removal process is not only easy to operate, but also can achieve the objective of opening/closing the case body 1 with a single hand, making it convenient for the user to easily mount and remove the electronic device. Moreover, because the user holds the electronic device all the way, the electronic device can be avoided from falling off and being damaged in the mounting and removal process.

Referring to FIG. 4 to FIG. 10, there are various sliding connection ways between the main case 11 and the auxiliary case 12, which are not limited in this solution. For ease of understanding, in this embodiment, a guide cavity 110 is provided on the main case 11; a guide block 120 is arranged on the auxiliary case 12; the guide block 120 is mounted in the guide cavity 110 and is in sliding fit with the guide cavity 110, so that the auxiliary case 12 can move away from or approach the main case 11. In this case, to facilitate the locking portion 2 to lock or unlock the auxiliary case 12 when the auxiliary case 12 approaches the main case 11, the locking portion 2 can lock or unlocks the guide block 120 in the guide cavity 110.

Specifically, due to the cooperative use of the guide block 120 and the guide cavity 110 when the auxiliary case 12 approaches the main case 11, the guide block 120 can be hidden, thereby beautifying its appearance. The design of locking or unlocking the guide block 120 in the guide cavity 110 by the locking portion 2 eliminates the need for providing an additional space on the main case 11 to place the locking portion 2, which can make the structure more compact and concise, and reduce the mold opening cost of the main case 11.

Referring to FIG. 4 to FIG. 10, regarding the locking portion 2, a bolt (not shown) that is in threaded connection with the main case 11 and penetrates through the guide cavity 110 can be directly used to resist against or release the guide block 120, or another structure is used. Due to the diversity of related structures, they will not be listed one by one in this solution. For ease of understanding, in this embodiment, a movable port 111 that communicates the outside world with the guide cavity 110 is arranged on a back side of the main case 11; the guide block 120 is provided with a buckle 121; the locking portion 2 includes a clamping head 21 and a deflector rod 22; the clamping head 21 is slidably arranged in the guide cavity 110; one end of the deflector rod 22 is connected to the clamping head 21, and the other end of the deflector rod 22 extends to the movable port 111; and the deflector rod 22 is pushed to drive the clamping head 21 to slide, so that the clamping head 21 resists against or is separated from the buckle 121.

Specifically, when the auxiliary case 12 approaches the main case 11 and fixes the electronic device, the deflector rod 22 drives the clamping head 21 to resist against the buckle 121 to lock the guide block 120 in the guide cavity 110, thereby avoiding relative sliding between the auxiliary case 12 and the main case 11. If the deflector rod 22 is pushed to drive the clamping head 21 to be separated from the buckle 121, the restriction on the guide block 120 will be relieved. At this time, the resetting portion 3 may drive the auxiliary case 12 to automatically move away from the main case 11 for a user to remove the electronic device.

The cooperative use of the clamping head 21 and the buckle 121 provides a more stable locking effect. One end of the deflector rod 22 extends to the movable port 111 located on the back side of the main case 11. On the one hand, it can serve as a fulcrum for force application, so that a user conveniently holds the main case 11 with one hand and pushes the deflector rod 22 with a finger; and on the other hand, it is possible to avoid accidental touch on the deflector rod 22 to cause the electronic device to fall off when the user holds the protective case with the electronic device for use.

Figure 6:
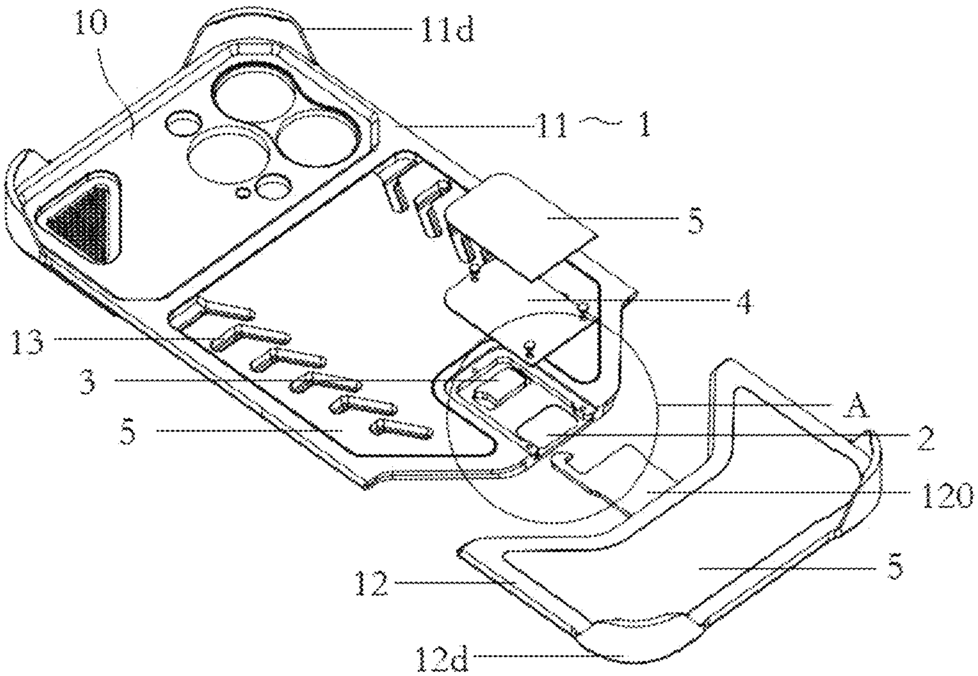
FIG. 6 shows a schematic exploded diagram I of FIG. 1.
Figure 7:
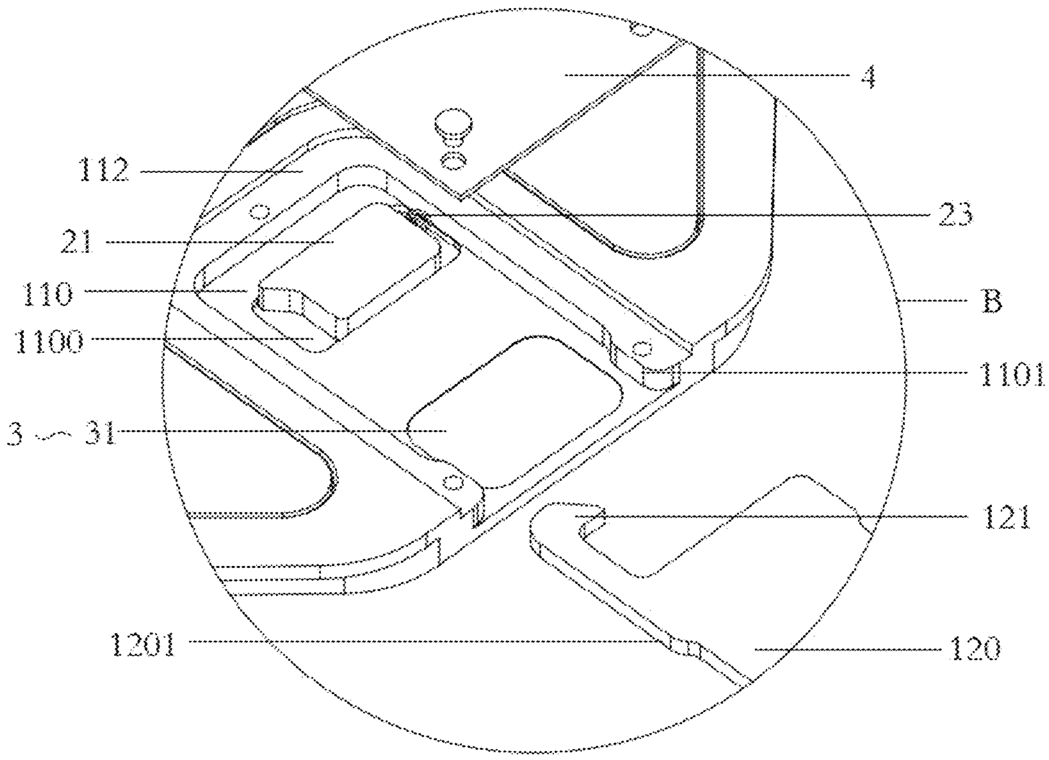
FIG. 7 shows an enlarged view of the part B in FIG. 6.
Figure 8:
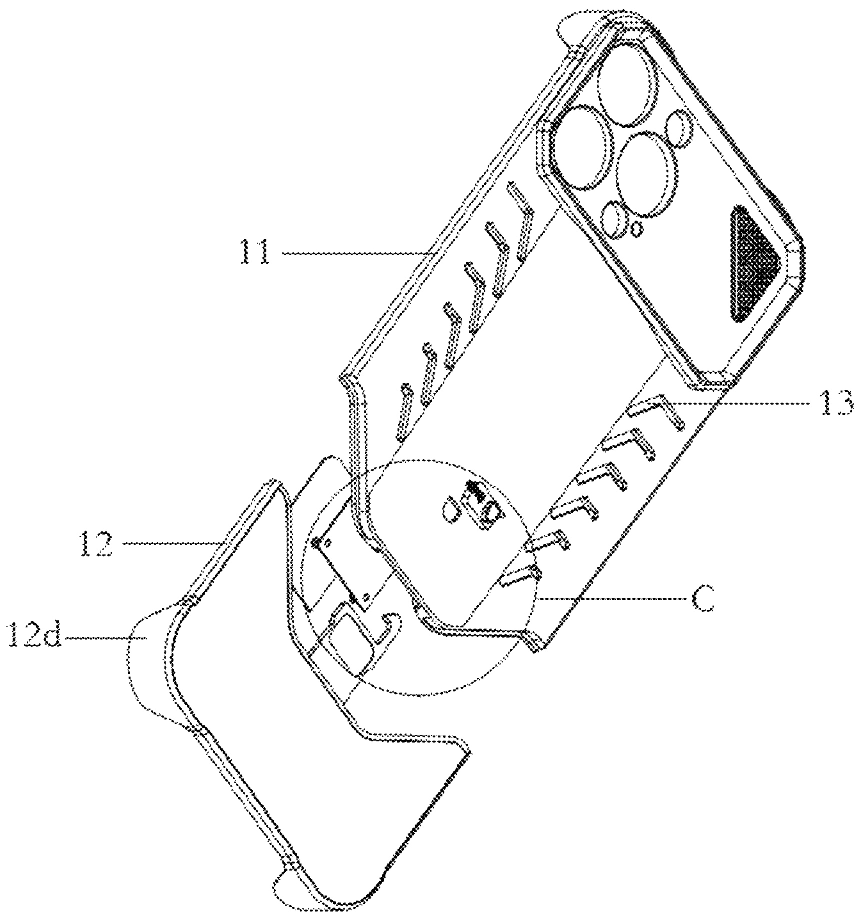
FIG. 8 shows a schematic exploded diagram II of FIG. 1.
Figure 9:
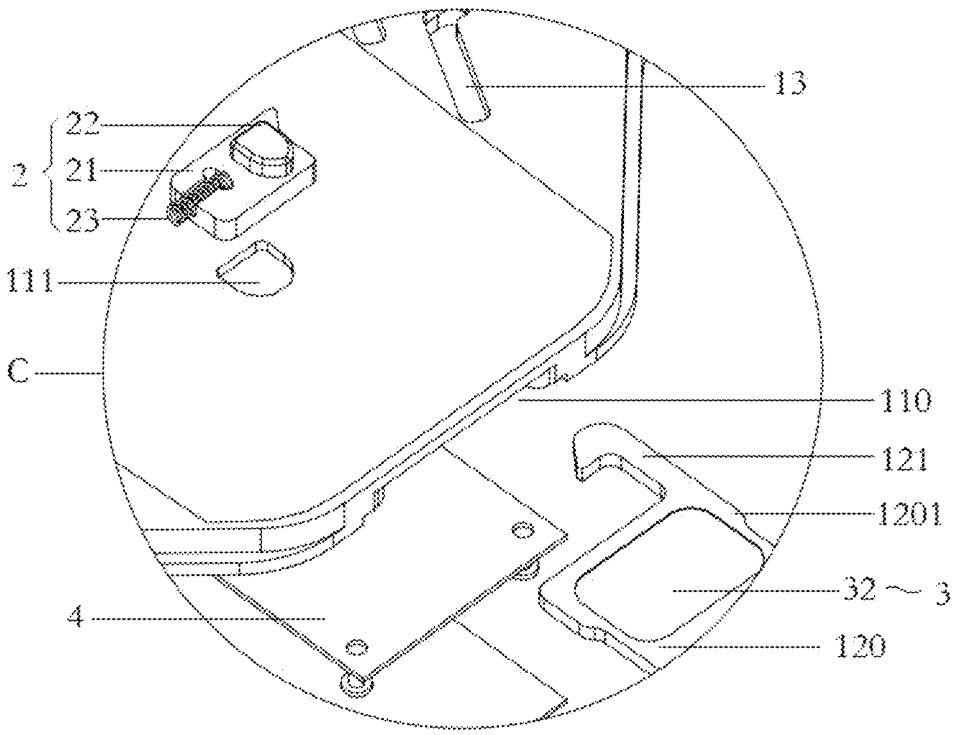
FIG. 9 shows an enlarged view of the part C in FIG. 8.
Figure 10:
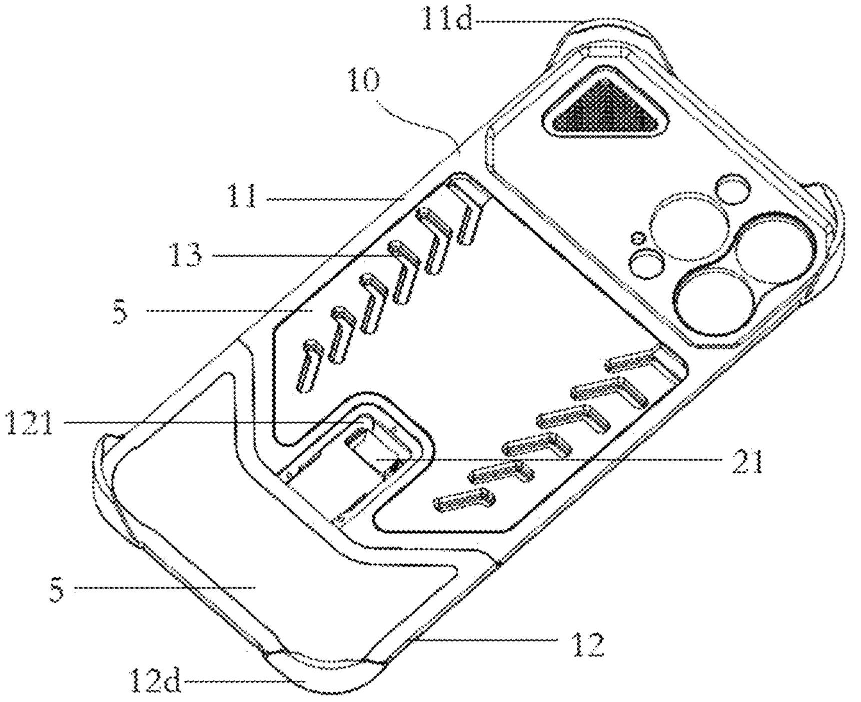
FIG. 10 shows a schematic diagram of an internal structure of FIG. 1.
Figure 11:
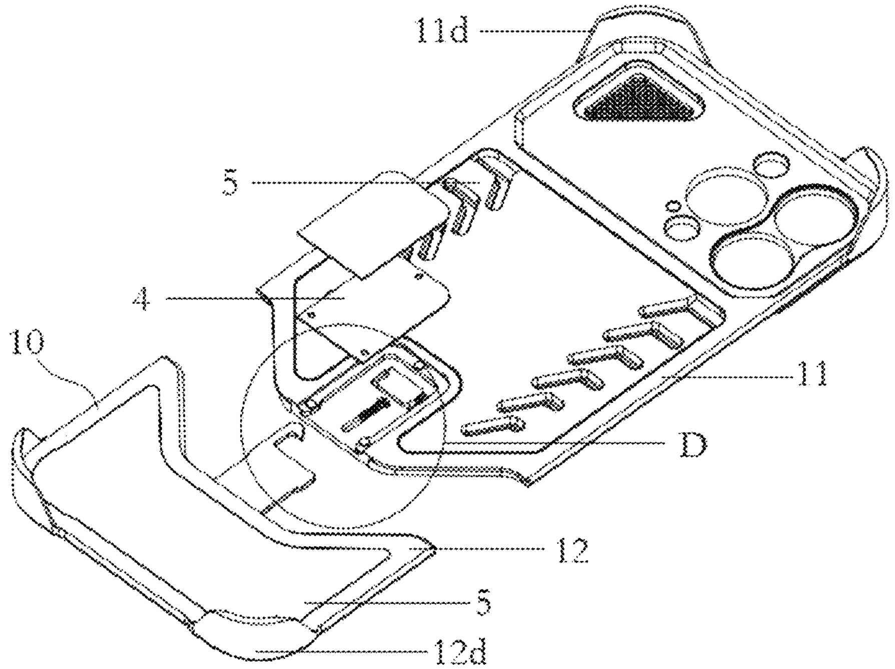
FIG. 11 shows a schematic diagram I of an entire structure according to a second embodiment of the present disclosure.
Figure 12:
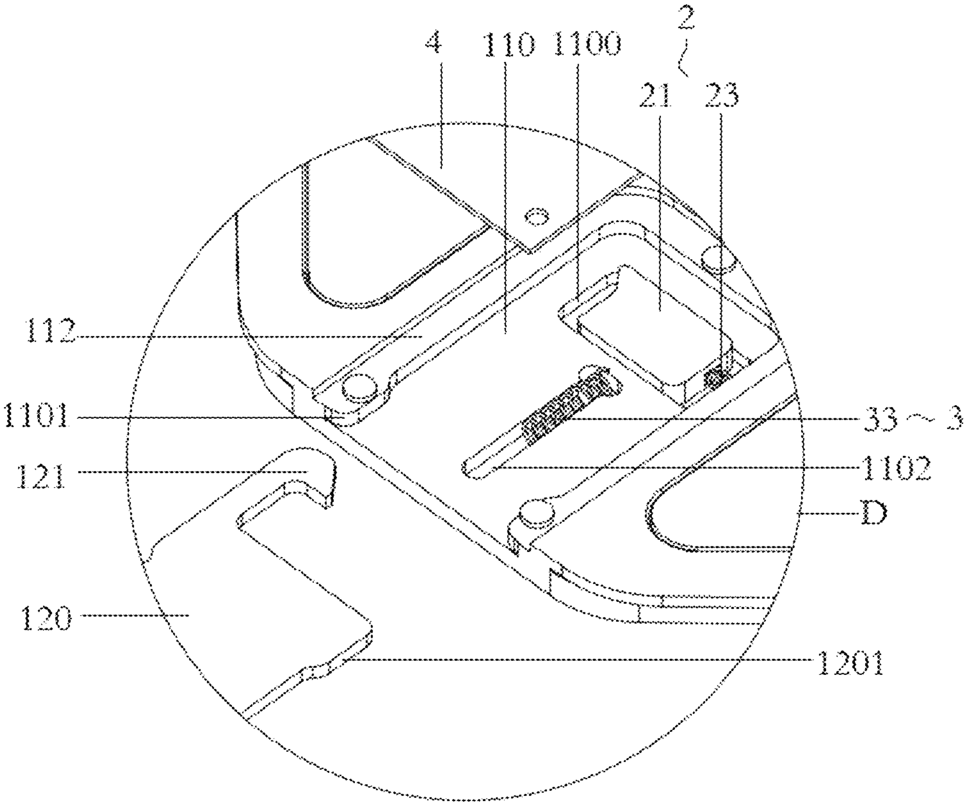
FIG. 12 shows an enlarged view of the part D in FIG. 11.
Figure 13:
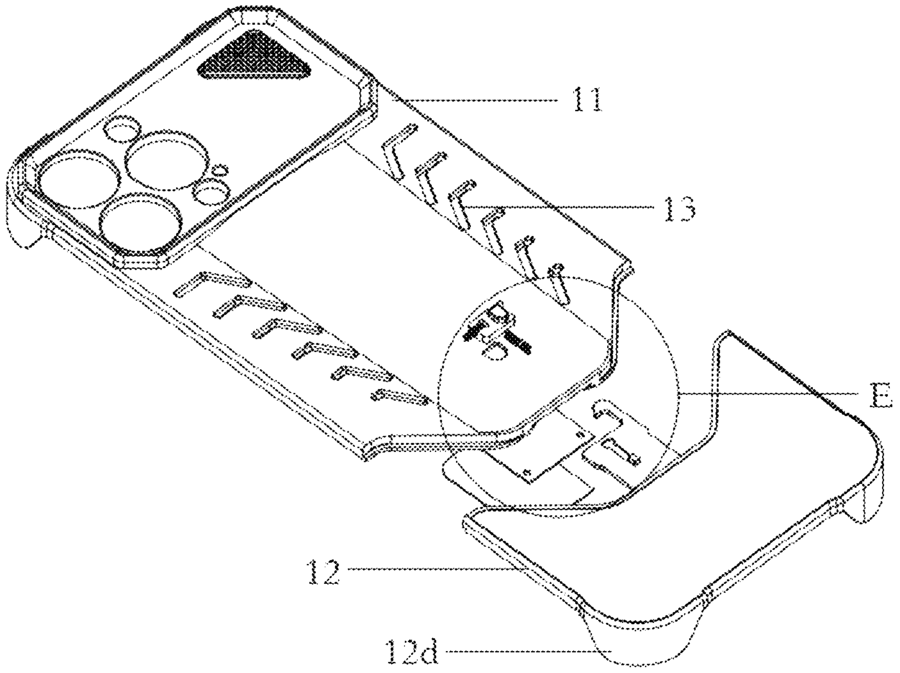
FIG. 13 shows a schematic diagram II of an entire structure according to a second embodiment of the present disclosure.
Figure 14:
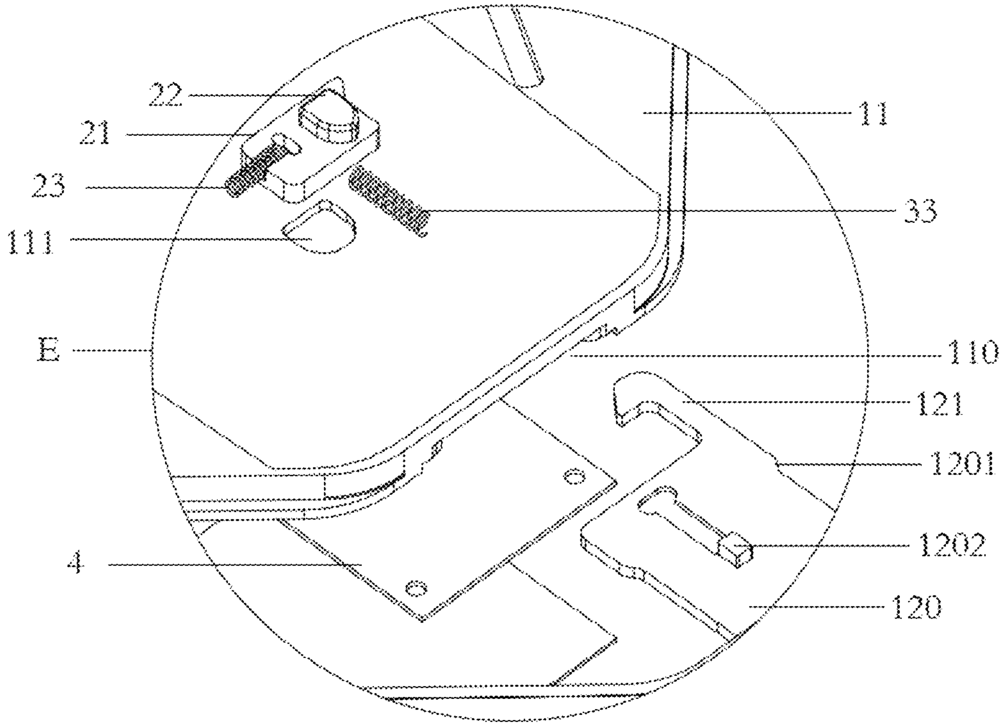
FIG. 14 shows an enlarged view of the part E in FIG. 13.

Referring to FIG. 6 to FIG. 7, a sliding chute 1100 is provided on an inner wall of the guide cavity 110, and the sliding chute 1100 corresponds to the movable port 111. The clamping head 21 is in sliding fit with the sliding chute 1100. The deflector rod 22 is pushed to drive the clamping head 21 to slide along the sliding chute 1100, thereby enabling the clamping head 21 to resist against or be separated from the buckle 121. The matching design between the sliding chute 1100 and the clamping head 21 can limit a sliding direction of the clamping head 21 and improve the sliding stability of the clamping head 21.

Referring to FIG. 4 to FIG. 9, considering that in an actual operation process, the auxiliary case 12 tends to move downwards under the action of the gravity after approaching the main case 11, so that it is difficult to align the buckle 121 with the clamping head 21, namely, it cannot ensure that the clamping head 21 smoothly resists against the buckle 121 if a user pushes the deflector rod 22. To solve this problem, in this embodiment, the locking portion 2 further includes a first elastic member 23 arranged in the guide cavity 110, and two ends of the first elastic member 23 respectively resist against the clamping head 21 and the inner wall of the guide cavity 110.

Specifically, when the auxiliary case 12 approaches the main case 11 and fixes the electronic device, the clamping head 21 resists against the buckle 121, and the first elastic member 23 is in an initial state. If the deflector rod 22 is pushed to drive the clamping head 21 to be separated from the buckle 121, the first elastic member 23 is compressed to store energy. After the resetting portion 3 drives the auxiliary case 12 to move away from the main case 11, the deflector rod 22 is released, and the first elastic member 23 releases energy for recovery and drives the clamping head 21 to return to its original position. When the auxiliary case 12 moves and approaches the main case 11 again, the clamping head 21 presses the buckle 121 and enables the first elastic member 23 to be compressed to store energy, and the clamping head 21 tends to return to its original position. At the moment the clamping head 21 is aligned with the buckle 121, the first elastic member 23 releases energy for recovery to its initial state and drives the clamping head 21 to resist against the buckle 121.

Therefore, due to the design of the first elastic member 23, the clamping head 21 has an automatic resetting function, so that in the process of the auxiliary case 12 approaching the main case 11, the clamping head 21 can be automatically clamped to the buckle 121, solving the problem caused by a manual operation.

Further, the first elastic member 23 can be a component with deformation and recovery capabilities, such as a rubber sleeve and a spring, which are not limited in this solution. For ease of understanding, the first elastic member 23 in this embodiment is a spring.

Referring to FIG. 6 to FIG. 9, the first magnetic body 31 is mounted on an inner wall of the guide cavity 110; the second magnetic body 32 is mounted on a side wall of the guide block 120; and the first magnetic body 31 and the second magnetic body 32 are not intersected on the same plane.

Specifically, due to the design of the mounting positions of the first magnetic body and the second magnetic body 32, the first magnetic body 31 and the second magnetic body 32 can be hidden in the guide cavity 110, avoiding rapid aging of the first magnetic body 31 and the second magnetic body 32 due to exposure to the outside. The design where the first magnetic body 31 and the second magnetic body 32 are not intersected on the same plane can achieve maximum repulsive force between the first magnetic body 31 and the second magnetic body 32, ensuring that when the clamping head 21 is misaligned with the buckle 121, the repulsive force between the first magnetic body 31 and the second magnetic body 32 can make the main case 11 and the auxiliary case 12 move away from each other.

Referring to FIG. 6 to FIG. 9, the rigid protective case convenient for mounting and removal further includes a cover plate 4; a notch 112 communicated to the guide cavity 110 is provided on the main case 11; the cover plate 4 is detachably mounted on the main case 11 and covers the notch 112; a limiting block 1101 is arranged on a side wall of the guide cavity 110; a protruding block 1201 is arranged on the guide block 120; the guide block 120 can mounted in the guide cavity 110 through the notch 112; and the protruding block 1201 resists against the limiting block 1101 as the auxiliary case moves 12 away from the main case 11.

Specifically, the design of the cover plate 4 and the notch 112 facilitates a user to mount the guide block 120 into the guide cavity 110, thereby improving the convenience of assembling. The cooperative use between the protruding block 1201 and the limiting block 1101 can restrict the guide block 120 from being separated from the guide cavity 110, thereby avoiding the auxiliary case 12 from falling off the main case 11 and improving the structural stability.

Referring to FIG. 1 to FIG. 6, the main case 11 is provided with two first resisting pins 11*d*; the auxiliary case 12 is provided with two second resisting pins 12*d*; the two first resisting pins 11*d* and the two second resisting pins 12*d* are enclosed to form the accommodating space 10, and are respectively arranged in a manner of corresponding to four corners of the electronic device. This design allows a rim of the electronic device to be exposed out of a peripheral side of the accommodating space 10. On the one hand, it can improve the hand feel of a bare machine and enhance the user experience. On the other hand, it is convenient for a user to hold the electronic device during mounting and removal, and the possibility that the electronic device falls off is reduced.

Further, the back side of the electronic device is synchronously attached to the main case 11 and the auxiliary case 12; top ends of the first resisting pins 11*d* and top ends of the second resisting pins 12*d* are hooked to synchronously resist against a front side rim of the electronic device, thereby preventing the electronic device from being separated from the accommodating space 10 and improving the mounting stability of the electronic device.

Further, the first resisting pins 11*d* and the second resisting pins 12*d* are provided with pin pads (not shown) to be in contact with the four corners of the electronic device, to reduce wear on the rim of the electronic device.

Referring to FIG. 1 to FIG. 6, a rubber pad 5 is laid on the main case 11 and/or the auxiliary case 12, and the main case 11 and/or the auxiliary case 12 are in contact with and adhered to a back side of the electronic device through the rubber pad 5. to reduce wear on the back side of the electronic device.

Referring to FIG. 1 to FIG. 7, the main case 11 and/or the auxiliary case 12 are provided with through holes 13 that penetrate through the main case and/or the auxiliary case.

Specifically, the main case 11 and the auxiliary case 12 are generally made of metal materials, so they are relatively heavy. The design of the through holes 13 can reduce the cost, reduce the weight of the rigid protective case, and beautify the appearance, and can be further configured to achieve heat dissipation on the electronic device.

Referring to FIG. 11 to FIG. 14, in addition to using the first magnetic body 31 and the second magnetic body 32 to drive the auxiliary case 12 to move away from the main case 11, another structure can be used too. For ease of understanding, in this embodiment, the resetting portion 3 further includes a second elastic member 33 configured to replace the first magnetic body 31 and the second magnetic body 32. The second elastic member 33 is mounted in the guide cavity 110, and two ends of the second elastic member 33 respectively resist against the inner wall of the guide cavity 110 and the guide block 120.

Specifically, when the auxiliary case 12 approaches the main case 11, the guide block 120 presses the second elastic member 33 to be compressed to store energy. In this case, the auxiliary case 12 is locked by the locking portion 2. When the locking portion 2 releases the auxiliary case 12, the second elastic member 33 releases the energy for recovery and drives the guide block 120 to return to its original position, so that the auxiliary case 12 automatically moves away from the main case 11.

Referring to FIG. 11 to FIG. 14, a trench 1102 is provided on an inner wall of the guide cavity 110, and the trench 1102 is arranged in a moving direction of the guide block 120. The guide block 120 is provided with a resisting block 1202 that is in sliding fit with the trench 1102; the second elastic member 33 is located in the trench 1102; and two ends of the second elastic member 33 respectively resist against an inner wall of the trench 1102 and the resisting block 1202.

Specifically, when the auxiliary case 12 approaches the main case 11, the resisting block 1202 moves along the trench 1102 and compress the second elastic member 33 to store energy. When the locking portion 2 unlocks the auxiliary case 12, the second elastic member 33 releases the energy for recovery and drives the resisting block 1202 to move along the trench 1102 and return to its original position. The design of the trench 1102 can provide an accommodating space for the second elastic member 33, and the sliding fit between the trench 1102 and the resisting block 1202 can increase the sliding stability of the guide block 120.

Further, the second elastic member 33 can be a component with deformation and recovery capabilities, such as a rubber sleeve and a spring, which are not limited in this solution. For ease of understanding, the second elastic member 33 in this embodiment is a spring.

It should be also noted that although the embodiments of the present disclosure have been shown and described, it can be understood by those of ordinary skill in the art that various changes, modifications, substitutions, and variations can be made to these embodiments without departing from the principle and spirit of the present disclosure.

What is claimed is:

1. A rigid protective case convenient for mounting and removal, comprising:

a case body, wherein the case body comprises a main case and an auxiliary case; the auxiliary case is slidably connected to the main case; the auxiliary case moves away from or approaches the main case; an accommodating space configured to place an electronic device is enclosed and formed between the main case and the auxiliary case;

a locking portion, wherein the locking portion is mounted on the main case; when the auxiliary case approaches the main case, the locking portion locks or unlocks the auxiliary case;

a resetting portion, wherein the resetting portion comprises a first magnetic body and a second magnetic body; the first magnetic body is mounted on the main case; the second magnetic body is mounted on the auxiliary case; and the first magnetic body and the second magnetic body are mutually exclusive to drive the auxiliary case to move away from the main case.

2. The rigid protective case convenient for mounting and removal according to claim 1, wherein a guide cavity is provided on the main case; a guide block is arranged on the auxiliary case; the guide block is mounted in the guide cavity and is in sliding fit with the guide cavity, so that the auxiliary case moves away from or approaches the main case; and when the auxiliary case approaches the main case, the locking portion locks or unlocks the guide block in the guide cavity.

3. The rigid protective case convenient for mounting and removal according to claim 2, wherein a movable port that communicates the outside world with the guide cavity is arranged on a back side of the main case; the guide block is provided with a buckle; the locking portion comprises a clamping head and a deflector rod; the clamping head is slidably arranged in the guide cavity; one end of the deflector rod is connected to the clamping head, and the other end of the deflector rod extends to the movable port; and the deflector rod is pushed to drive the clamping head to slide, so that the clamping head resists against or is separated from the buckle.

4. The rigid protective case convenient for mounting and removal according to claim 3, wherein the locking portion further comprises a first elastic member arranged in the guide cavity; two ends of the first elastic member respectively resist against the clamping head and an inner wall of the guide cavity; in a process of moving the clamping head to press the buckle, the first elastic member is compressed to stores energy; and after the clamping head resists against the buckle, the first elastic member releases energy for recovery.

5. The rigid protective case convenient for mounting and removal according to claim 2, wherein the first magnetic body is mounted on an inner wall of the guide cavity; the second magnetic body is mounted on a side wall of the guide block; and the first magnetic body and the second magnetic body are not intersected on the same plane.

6. The rigid protective case convenient for mounting and removal according to claim 2, further comprising a cover plate, wherein a notch communicated to the guide cavity is provided on the main case; the cover plate is detachably mounted on the main case and covers the notch; a limiting block is arranged on a side wall of the guide cavity; a protruding block is arranged on the guide block; the guide block is mounted in the guide cavity through the notch; and the protruding block resists against the limiting block as the auxiliary case moves away from the main case to restrict the guide block from being separated from the guide cavity.

7. The rigid protective case convenient for mounting and removal according to claim 2, wherein the resetting portion comprises a second elastic member configured to replace the first magnetic body and the second magnetic body; the second elastic member is mounted in the guide cavity; two ends of the second elastic member respectively resist against the inner wall of the guide cavity and the guide block; and when the auxiliary case approaches the main case, the second elastic member is compressed to store energy.

8. The rigid protective case convenient for mounting and removal according to claim 1, wherein the main case is provided with two first resisting pins; the auxiliary case is provided with two second resisting pins; the two first resisting pins and the two second resisting pins are enclosed to form the accommodating space, and are respectively arranged in a manner of corresponding to four corners of the electronic device.

9. The rigid protective case convenient for mounting and removal according to claim 1, wherein a rubber pad is laid on the main case and/or the auxiliary case, and the main case and/or the auxiliary case are in contact with and adhered to a back side of the electronic device through the rubber pad.

10. The rigid protective case convenient for mounting and removal according to claim 1, wherein the main case and/or the auxiliary case are provided with through holes that penetrate through the main case and/or the auxiliary case.

* * * * *